(12) United States Patent
Lu

(10) Patent No.: US 10,944,558 B2
(45) Date of Patent: Mar. 9, 2021

(54) KEY STORING METHOD, KEY MANAGING METHOD AND APPARATUS

(71) Applicant: TENCENT TECHNOLOGY (SHENZHEN) COMPANY LIMITED, Guangdong (CN)

(72) Inventor: Qiang Lu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 95 days.

(21) Appl. No.: 15/997,981

(22) Filed: Jun. 5, 2018

(65) Prior Publication Data
US 2018/0287795 A1    Oct. 4, 2018

Related U.S. Application Data

(63) Continuation of application No. PCT/CN2017/070606, filed on Jan. 9, 2017.

(30) Foreign Application Priority Data

Jan. 8, 2016 (CN) .......................... 201610015004.6

(51) Int. Cl.
*H04L 29/06* (2006.01)
*H04L 9/08* (2006.01)
(Continued)

(52) U.S. Cl.
CPC .............. *H04L 9/0894* (2013.01); *G09C 1/00* (2013.01); *H04L 9/0861* (2013.01);
(Continued)

(58) Field of Classification Search
CPC ... H04L 9/0894; H04L 9/0861; H04L 9/3226; H04L 9/3239; H04L 9/0825;
(Continued)

(56) References Cited

U.S. PATENT DOCUMENTS 7,546,459 B2 *  6/2009  Robles .................. H04L 63/162
                                              713/168
7,693,286 B2 *  4/2010  Sutton, II .............. H04L 9/0897
                                              380/282
(Continued)

FOREIGN PATENT DOCUMENTS

CN     1697372 A       11/2005
CN     1697372 A   *   11/2005
(Continued)

OTHER PUBLICATIONS (IBM, Enabling RSA key-based authentication on UNIX and Linux operating systems, https://www.ibm.com/support/knowledgecenter/SSIGMP_1.0.0/igi/unixandlinux/install_config/t_key_unilinux.htm, Oct. 2014, hereinafter IBM).*
(Continued)

*Primary Examiner* — Maung T Lwin
(74) *Attorney, Agent, or Firm* — Knobbe, Martens, Olson & Bear, LLP

(57) ABSTRACT

The present disclosure provides a key storing method, a key managing method and apparatus which belong to terminal technologies. An example method includes generating a terminal root secret key. A first key digest of the terminal root secret key is generated. The terminal root secret key is stored in a first specified storage region of a terminal, the first specified storage region being a password protected region. The first key digest is stored in a second specified storage region in the terminal, the second specified storage region being a programmable hardware region with fusible features.

12 Claims, 4 Drawing Sheets

(51) Int. Cl.
　　　*H04L 9/32*　　　　(2006.01)
　　　*G09C 1/00*　　　　(2006.01)
　　　*H04W 12/041*　　(2021.01)
　　　*H04W 12/0433*　(2021.01)

(52) U.S. Cl.
　　　CPC .......... *H04L 9/3226* (2013.01); *H04L 9/3239* (2013.01); *H04L 63/0428* (2013.01); *H04L 63/06* (2013.01); *H04W 12/041* (2021.01); *H04W 12/0433* (2021.01); *H04L 9/0825* (2013.01); *H04L 2209/80* (2013.01)

(58) Field of Classification Search
　　　CPC . H04L 63/0428; H04L 63/06; H04L 2209/80; H04L 9/3247; H04L 63/0823; H04L 63/0853; G09C 1/00; H04W 12/04
　　　See application file for complete search history.

(56) References Cited

U.S. PATENT DOCUMENTS

| | | | | |
|---|---|---|---|---|
| 7,904,720 | B2* | 3/2011 | Smetters | H04L 9/3265 713/175 |
| 8,291,226 | B2* | 10/2012 | Chun | G06F 21/64 713/176 |
| 9,479,340 | B1* | 10/2016 | Miller | G09C 1/00 |
| 10,116,645 | B1* | 10/2018 | Miller | G06F 21/44 |
| 10,250,396 | B2* | 4/2019 | Ignatchenko | H04L 63/0428 |
| 10,469,264 | B2* | 11/2019 | Uhr | H04L 63/0428 |
| 10,498,772 | B2* | 12/2019 | Adhar | H04L 63/105 |
| 10,551,803 | B2* | 2/2020 | Gruendken | A61M 1/1601 |
| 10,686,799 | B2* | 6/2020 | Kelly | H04L 9/3247 |
| 2001/0056359 | A1* | 12/2001 | Abreu | A61B 5/4848 705/3 |
| 2005/0041803 | A1* | 2/2005 | Chateau | G06F 7/58 380/46 |
| 2005/0251681 | A1* | 11/2005 | Robles | H04L 9/0844 713/172 |
| 2006/0126422 | A1* | 6/2006 | Takagi | G06Q 20/32 365/232 |
| 2006/0155801 | A1* | 7/2006 | Brabson | H04W 80/04 709/201 |
| 2006/0242065 | A1* | 10/2006 | Jogand-Coulomb | G06F 21/62 705/50 |
| 2007/0192610 | A1* | 8/2007 | Chun | G06F 21/64 713/176 |
| 2008/0061941 | A1* | 3/2008 | Fischer | H04L 9/3226 340/10.1 |
| 2009/0222653 | A1* | 9/2009 | Findeisen | G06F 21/72 713/2 |
| 2011/0113443 | A1* | 5/2011 | Yu | H04N 21/4627 725/28 |
| 2011/0179474 | A1* | 7/2011 | Yegin | H04W 76/10 726/6 |
| 2012/0079287 | A1* | 3/2012 | Leclercq | G06F 21/575 713/192 |
| 2012/0290834 | A1* | 11/2012 | Yamaguchi | H04L 9/3263 713/156 |
| 2013/0114813 | A1* | 5/2013 | Chai | H04L 9/0891 380/270 |
| 2013/0179681 | A1* | 7/2013 | Benson | H04W 12/04 713/155 |
| 2014/0129818 | A1* | 5/2014 | Li | G06F 21/79 713/2 |
| 2014/0148818 | A1* | 5/2014 | Komuro | A61B 34/30 606/130 |
| 2014/0250290 | A1* | 9/2014 | Stahl | G06F 9/4401 713/2 |
| 2015/0002900 | A1* | 1/2015 | Cochran | G06F 21/608 358/1.16 |
| 2015/0095652 | A1* | 4/2015 | Song | H04L 9/0861 713/176 |
| 2015/0265221 | A1* | 9/2015 | Flanagan | A61B 5/0809 600/484 |
| 2016/0028539 | A1 | 1/2016 | Su et al. | |
| 2016/0080336 | A1* | 3/2016 | Ryan | H04L 9/0891 713/171 |
| 2016/0182238 | A1* | 6/2016 | Dewan | H04L 9/3242 713/171 |
| 2016/0182478 | A1* | 6/2016 | Gremaud | H04L 9/0861 380/259 |
| 2017/0006023 | A1* | 1/2017 | Behnken | H04L 63/0853 |
| 2018/0157853 | A1* | 6/2018 | Kumar | G06F 12/1408 |
| 2018/0177398 | A1* | 6/2018 | Kullik | G16H 40/60 |
| 2018/0212771 | A1* | 7/2018 | Howell | H04L 9/085 |
| 2018/0287795 | A1* | 10/2018 | Lu | H04L 63/0428 |
| 2019/0174303 | A1* | 6/2019 | Zhou | H04L 63/062 |
| 2019/0258581 | A1* | 8/2019 | Lee | G06F 3/061 |
| 2019/0318356 | A1* | 10/2019 | Martin | H04L 9/3239 |
| 2019/0349376 | A1* | 11/2019 | Phillips | H04L 9/3265 |
| 2020/0117550 | A1* | 4/2020 | Zhang | H04L 9/3239 |
| 2020/0169389 | A1* | 5/2020 | Zuo | H04L 9/0643 |
| 2020/0218821 | A1* | 7/2020 | Liu | G06F 21/606 |

FOREIGN PATENT DOCUMENTS

| | | | | |
|---|---|---|---|---|
| CN | 101174942 | A | | 5/2008 |
| CN | 101447870 | A * | | 6/2009 |
| CN | 101447870 | A | | 6/2009 |
| CN | 103731260 | A | | 4/2014 |
| CN | 105681032 | A | | 6/2016 |
| CN | 105765897 | A * | 7/2016 | .............. H04L 9/08 |
| CN | 106301774 | A * | 1/2017 | |
| CN | 105681032 | B * | 9/2017 | .............. G09C 1/00 |
| EP | 3197089 | A1 * | 7/2017 | .......... H04L 9/3247 |
| JP | 2012175187 | A * | 9/2012 | |
| KR | 10-2007-0098869 | | 10/2007 | |
| KR | 10-0897075 | B | 5/2009 | |
| KR | 100897075 | B1 * | 5/2009 | |
| WO | WO-2016070382 | A1 * | 5/2016 | .............. H04L 9/08 |

OTHER PUBLICATIONS (Ruby, Class_OpenSSL__HMAC, https://ruby-doc.org/stdlib-2.4.0/libdoc/openssl/rdoc/OpenSSL, Dec. 2015, hereinafter Ruby).*
(Wiki, Filesystem in Userspace, https://en.wikipedia.org/wiki/Filesystem_in_Userspace, Sep. 2009, hereinafter Wiki).*
Anil Kumar Reddy, et al., Mobile Secure Data protection using eMMC, 2015 Intl. Conference on Computing and Network Communications (CoCoNet'15), Dec. 16-19, 2015, Trivandrum, India, pp. 1-5.*
Siteground, How to generate an SSH key pair in Linux, https://www.siteground.com/kb/generate_ssh_key_in_linux/, Apr. 2008, pp. 1-3.*
Thierry Moreau, A Note About Trust Anchor Key Distribution, Jul. 5, 2005, Connotech Experts—conseils inc, pp. 1-5.*
Jeffrey S. Dwoskin, et al., Hardware-rooted trust for secure key management and transient trust, CCS '07: Proceedings of the 14th ACM conference on Computer and communications security, Oct. 2007, pp. 389-400.*
International Search Report with Translation for International Application No. PCT/CN2017/070606 dated Mar. 30, 2017.
Chinese Office Action with Concise Explanation of Relevance for Application No. 201610015004.6 dated Dec. 14, 2016.
Digital World Storing Fingerprint Identification in Hardware Storage, Glory 7, The Phone Least Attractive to Thieves with its English translation dated Aug. 13, 2018.
International Preliminary Report on Patentability for International Application No. PCT/CN2017/070606 dated Jul. 10, 2018 in 6 pages.
Office Action Issued in Korean Application No. 10-2018-7019322 dated Dec. 20, 2019 in 7 pages.
Office Action Issued in Korean Patent Application No. 10-2018-7019322 dated Jun. 22, 2020.

* cited by examiner

KEY STORING METHOD, KEY MANAGING METHOD AND APPARATUS

CROSS REFERENCE TO RELATED APPLICATIONS

This application is a continuation of International Application PCT/CN2017/070606, which claims priority to Chinese Patent Application No. 201610015004.6 titled "Key Storing Method, Key Managing Method and Apparatus" and filed on Jan. 8, 2016. The disclosures of each of the above-recited applications are hereby incorporated by reference in their entireties for all purposes.

Any and all applications for which a foreign or domestic priority claim is identified in the Application Data Sheet as filed with the present application are hereby incorporated by reference under 37 CFR 1.57.

BACKGROUND

Field

The present disclosure relates to terminal technologies, and in particular to a key storing method, a key managing method and apparatus.

Description of the Related Technology

With continuous development in terminal technologies, security and confidentiality of terminal systems are also improving. When a terminal communicates data with a third party application, the third party application requires a secret key of the terminal for encrypting or decrypting transmitted data to improve the security of data transmission. Therefore, the security of key storage in a terminal is of great importance in research in data transmission security.

SUMMARY

To address at least a disadvantage of a conventional mechanism, embodiments of the present disclosure provide a key storing method, a key managing method and apparatus.

Various embodiments of the present disclosure provide a key storing method which may include:
 generating a terminal root secret key;
 generating a first key digest of the terminal root secret key;
 storing the terminal root secret key in a first specified storage region in a terminal, the first specified storage region is a password protected region; and
 storing the first key digest in a second specified storage region in the terminal, the second specified storage region is a programmable hardware region with fusible features.

Various embodiments of the present disclosure provide a key managing method which may include:
 obtaining a terminal root secret key and a first key digest respectively from a first specified storage region and a second specified storage region in the terminal, the first key digest is a digest of the terminal root secret key, the first specified storage region is a password protected region, and the second specified storage region is a programmable hardware region with fusible features;
 generating a second key digest of the terminal root secret key;
 comparing the second key digest with the first key digest; and
 continuing using the terminal root secret key when the second key digest is consistent with the first key digest.

Various embodiments of the present disclosure provide a key storing apparatus which may include:
 a root key generating module, configured for generating a terminal root secret key;
 a first key digest generating module, configured for generating a first key digest of the terminal root secret key generated by the root key generating module;
 a root key storing module, configured for storing the terminal root secret key generated by the root key generating module into a first specified storage region in the terminal, the first specified storage region is a password protected region; and
 a key digest storing module, configured for storing the first key digest generated by the first key digest generating module into a second specified storage region in the terminal, the second specified storage region is a programmable hardware region having fusible features.

Various embodiments of the present disclosure provide a key managing apparatus which may include:
 an obtaining module, configured for obtaining a terminal root secret key and a first key digest respectively from a first specified storage region and a second specified storage region in the terminal; the first key digest is a key digest of the terminal root secret key, the first specified storage region is a password protected region, and the second specified storage region is a programmable hardware region with fusible features;
 a second key digest generating module, configured for generating a second key digest of the terminal root secret key;
 a comparing module, configured for comparing the second key digest with the first key digest; and
 a processing module, configured for continuing using the terminal root secret key when the second key digest is consistent with the first key digest.

Various embodiments of the present disclosure provide a key storing apparatus which may include:
 one or multiple memories;
 one or multiple processors; wherein
 the one or multiple memories store one or multiple instruction modules configured to be executed by the one or multiple processors;
 the one or multiple instruction modules may include:
 a root key generating module, configured for generating a terminal root secret key;
 a key digest generating module, configured for generating a key digest of the terminal root secret key generated by the root key generating module;
 a root key storing module, configured for storing the terminal root secret key generated by the root key generating module into a first specified storage region in the terminal, the first specified storage region is a password protected region; and
 a key digest storing module, configured for storing the key digest generated by the key digest generating module into a second specified storage region in the terminal, the second specified storage region refers to a programmable hardware region having fusible features.

Various embodiments of the present disclosure provide a key managing apparatus which may include:
 one or multiple memories;
 one or multiple processors; wherein
 the one or multiple memories store one or multiple instruction modules configured to be executed by the one or multiple processors;

the one or multiple instruction modules may include:

an obtaining module, configured for obtaining a terminal root secret key and a first key digest respectively from a first specified storage region and a second specified storage region in the terminal; the first key digest is a key digest of the terminal root secret key, the first specified storage region is a password protected region, and the second specified storage region is a programmable hardware region with fusible features;

a second key digest generating module, configured for generating a second key digest of the terminal root secret key;

a comparing module, configured for comparing the second key digest with the first key digest; and a processing module, configured for continuing using the terminal root secret key when the second key digest is consistent with the first key digest.

Various embodiments of the present disclosure provide a non-transitory computer-readable storage medium which may include: one or multiple programs;

the one or multiple programs are configured to be executable by the one or multiple processors to:

generate a terminal root secret key;

generate a first key digest of the terminal root secret key;

store the terminal root secret key in a first specified storage region of a terminal, the first specified storage region is a password protected region; and store the first key digest in a second specified storage region in the terminal, the second specified storage region is a programmable hardware region with fusible features.

Various embodiments of the present disclosure provide a non-transitory computer-readable storage medium which may include: one or multiple programs; the one or multiple programs are configured to be executable by the one or multiple processors to:

obtain a terminal root secret key and a first key digest respectively from a first specified storage region and a second specified storage region in the terminal, the first key digest is a digest of the terminal root secret key, the first specified storage region is a password protected region, and the second specified storage region is a programmable hardware region with fusible features;

generate a second key digest of the terminal root secret key;

compare the second key digest may be compared with the first key digest; and continue using the terminal root secret key when the second key digest is consistent with the first key digest.

According to embodiments of the present disclosure, storing a terminal root secret key in a first specified storage region in a terminal and storing a first key digest of the terminal root secret key in a second specified storage region in the terminal can avoid the terminal root secret key and the key digest being tampered with by other programs, thus improve the storage security of the secret key.

BRIEF DESCRIPTION OF THE DRAWINGS

In order to make the technical scheme of embodiments of the present disclosure clear, the following is a brief introduction of the drawings used in description of the embodiments. The following drawings may represent some of the embodiments, and other drawings and embodiments may be obtained by those skilled in the art without doing any inventive work.

DETAILED DESCRIPTION

Some examples are hereinafter described in detail with reference to the accompanying drawings to make the objective, technical scheme and merits of the present disclosure apparent.

Exemplary embodiments are described in detail herein, and examples are shown in the accompanying drawings. When the following description refers to the accompanying drawings, unless otherwise indicated, same numerals in different drawings denote same or similar elements. The examples described in the exemplary embodiments are not all embodiments of the present disclosure. Rather, they are merely examples of apparatus and methods in accordance with some aspects of the present disclosure as detailed in the appended claims.

Figure 1:
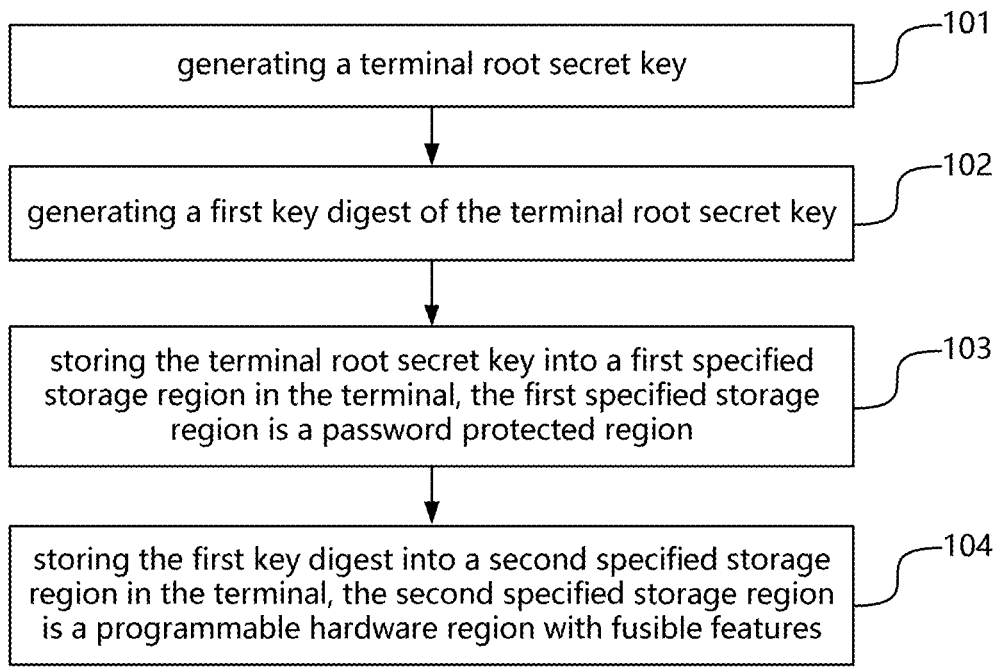
FIG. 1 is a flowchart illustrating a key storing method according to an embodiment of the present disclosure.

FIG. 1 is a flowchart illustrating a key storing method according to an embodiment of the present disclosure. As shown in FIG. 1, the method may include the following procedures.

At 101, a terminal root secret key may be generated.

At 102, a first key digest of the terminal root secret key may be generated.

At 103, the terminal root secret key may be stored in a first specified storage region of a terminal. The first specified storage region may be a password protected region.

At 104, the first key digest may be stored in a second specified storage region in the terminal. The second specified storage region refers to a programmable hardware region with fusible features.

The method of the present disclosure, which stores the terminal root secret key into the first specified storage region in the terminal and stores the first key digest into the second specified storage region in the terminal, can prevent other programs from tampering with the terminal root secret key and the key digest, and thus can improve storage security of the key.

In a first example of the present disclosure, the first specified storage region and the second specified storage region are two storage regions independent from each other in the terminal.

In a second example of the present disclosure, the terminal root secret key may be a private key in a key pair generated according to an asymmetric key algorithm.

Figure 2:
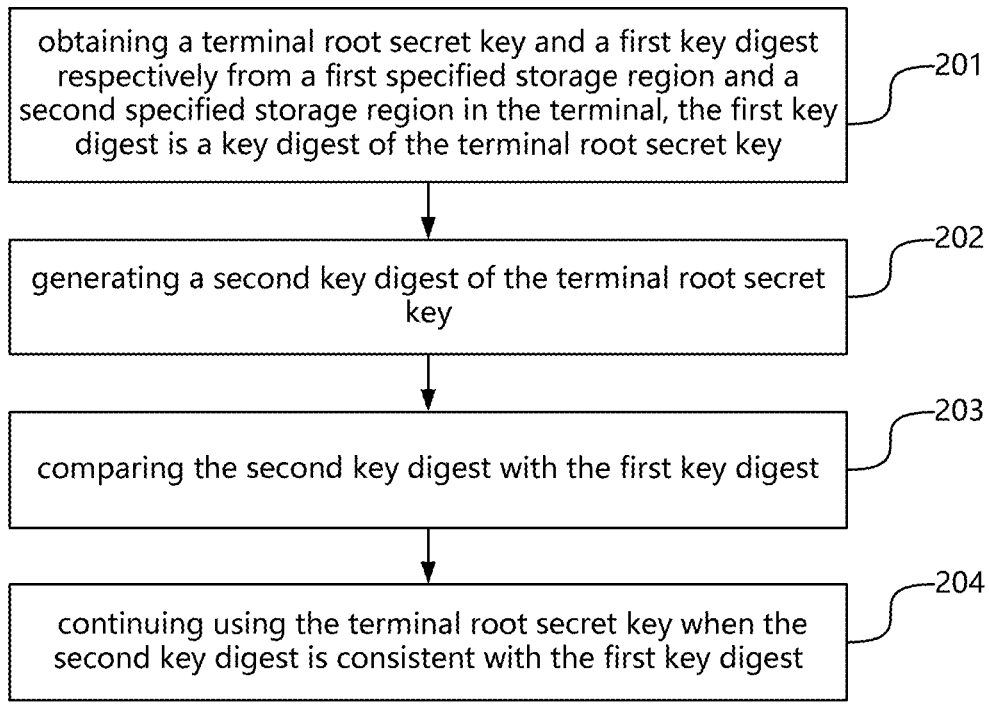
FIG. 2 is a flowchart illustrating a key managing method according to an embodiment of the present disclosure.

FIG. 2 is a flowchart illustrating a key managing method according to an embodiment of the present disclosure. As shown in FIG. 2, the method may include the following procedures.

At 201, a terminal root secret key and a first key digest may be obtained respectively from a first specified storage region and a second specified storage region in the terminal.

The first key digest is a digest of the terminal root secret key, the first specified storage region may be a password protected region, and the second specified storage region may be a programmable hardware region with fusible features.

At 202, a second key digest of the terminal root secret key may be generated.

At 203, the second key digest may be compared with the first key digest.

At 204, the terminal root secret key may be continued to be used when the second key digest is consistent with the first key digest.

In a first example of the present disclosure, after comparing the second key digest with the first key digest, the method may also include:

reporting an error and stopping using the terminal root secret key when the second key digest is inconsistent with the first key digest.

In a second example of the present disclosure, the second key digest of the private key in the terminal root secret key may be generated using the same algorithm for generating the first key digest of the private key in the terminal root secret key.

In a third example of the present disclosure, the terminal root secret key may be a private key in a key pair generated according to an asymmetric key algorithm.

Figure 3:
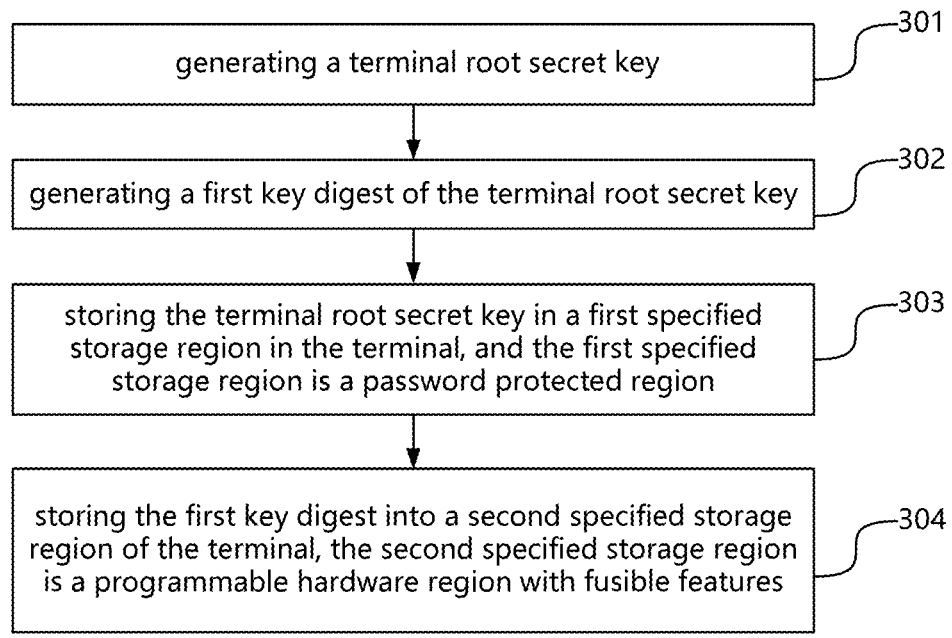
FIG. 3 is a flowchart illustrating a key storing method according to an embodiment of the present disclosure.

FIG. 3 is a flowchart illustrating a key storing method according to an embodiment of the present disclosure. As shown in FIG. 3, the method may include the following procedures.

At 301, a terminal root secret key may be generated.

In data transmission with a terminal, a transmitting party needs to encrypt the transmitted data with the secret key so that only the receiving party having the secret key can decrypt the encrypted data to obtain the data transmitted by the transmitting party. It should be noted that when the terminal root secret key is an asymmetric key, the private key of the terminal root secret key may be stored in the terminal. The private key of the terminal root secret key is used for encrypting or decrypting transmitted data. A third party communicating data with the terminal requires a public key of the terminal root secret key for encrypting or decrypting transmitted data to implement data transmission between the terminal and the third party.

At present, terminal manufacturers may write a terminal root secret key generated by a key generating server into Trusted Application (TA) codes of the terminal to store the terminal root secret key before the terminal is shipped from the factory. The TA runs in a Trusted Execution Environment (TEE) of the terminal. Logical behaviors and storage behaviors of the TA are all safe behaviors. The TEE may be considered as another operating system operating in a trusted environment of the terminal. Data processed in the TEE is independent of the visible operating system of the terminal. However, this key storing method of writing the terminal key in the TA code may make the same model or the same batch of terminals have to share only one key or key pair. Once the shared key is leaked, the security may be at risk. That is, such externally generated terminal root secret key is easy to be tampered with or stolen by malicious applications, thus has low security of key storage.

In order to address the above problem, embodiments of the present disclosure provide a method of writing codes for generating a terminal root secret key into a TA. When a root key generation instruction is received, the terminal may generate a terminal root secret key and a key digest of the terminal root secret key using a digest algorithm, and store the terminal root secret key and the key digest separately in different storage regions of the terminal to improve the storage security of the terminal root secret key.

It should be noted that, when the terminal generates an asymmetric key pair which includes a public key and a private key, the terminal root secret key is the private key in the key pair and is the key used for transmitting data between the terminal and other devices or applications. The method of generating the terminal root secret key is not limited in the present disclosure.

At 302, a first key digest of the terminal root secret key may be generated.

The method of generating the first key digest of the private key in the terminal root secret key may include: using an irreversible string transformation algorithm to generate the first key digest of the private key in the terminal root secret key by taking the private key as text information. The irreversible string transformation algorithm may be a hash algorithm, or another algorithm, which is not limited in the present disclosure. The first key digest of the private key in the terminal root secret key may be generated using another method, which is not limited in the present disclosure.

It should be noted that, when the terminal root secret key is a private key in an asymmetric key pair generated using an asymmetric key algorithm, the first key digest generated is a key digest of the private key.

By generating the first key digest of the terminal root secret key, when an invalid user or program tampers with the terminal root secret key, the terminal can find out the temperament in time and take appropriate measures to avoid greater security risks and data loss.

At 303, the terminal root secret key may be stored in a first specified storage region of a terminal. The first specified storage region may be a password protected region.

The first specified storage region may be a Replay Protected Memory Block (RPMB). A RPMB is a special storage region of an Embedded Multi Media Card (eMMC) chip, and a password is required to access the region. That is, the first specified storage region is a password protected region. The eMMC may be composed of an embedded storage solution, including a MMC interface, a flash memory device, and a main controller. The first specified storage region may also be a password protected region of another type in the terminal, which is not limited in the present disclosure.

It should be noted that, when the terminal root secret key is a private key in the key pair generated using the asymmetric key algorithm, a public key in the terminal root secret key may be stored by a manufacturer of the terminal, or stored in a key management server which stores public keys in terminal root secret keys. The method of storing the public key in the terminal root secret key is not limited in the present disclosure.

Storing the terminal root secret key into the first specified storage region can make the terminal root secret key less likely to be tampered with, and thus improve the storage security of the terminal root secret key.

At 304, the first key digest may be stored in a second specified storage region in the terminal. The second specified storage region refers to a programmable hardware region with fusible features.

The second storage region may be an eFUSE region. The region is a programmable hardware region in a central processing chip of the terminal. Data may be dynamically written into the region by a running program. The region has fusible features, e.g., data cannot be modified once written into the region. The second specified storage region may also be a storage region with the above features in the terminal, and is not limited in the present disclosure.

It should be noted that the first specified storage region and the second specified storage region are two storage regions independent from each other in the terminal. The terminal root secret key and the digest of the terminal root secret key can be protected from being stolen or tampered with at the same time by storing the terminal root secret key and the first key digest of the terminal root secret key into the two independent storage regions in the terminal, and thus the storage security of the terminal root secret key can be improved.

By storing the first key digest in the second specified storage region, the fusible features of the second specified storage area may be utilized so that other programs cannot modify the first key digest, thereby storage security of the terminal root secret key can be improved.

The key storing method according to embodiments of the present application can prevent other programs modifying both the terminal root secret key and the key digest by storing the terminal root secret key into the first specified storage region in the terminal and storing the first key digest of the terminal root secret key into the second specified storage region in the terminal, thus improve storage security of the key. Further, the terminal root secret key and the digest of the terminal root secret key can be protected from being stolen or modified of by storing the terminal root secret key and the first key digest of the terminal root secret key into the two independent storage regions of the terminal, and thus the storage security of the terminal root secret key can be further improved.

When the terminal is to use the terminal root secret key, the terminal root secret key can be obtained from the first specified storage region. For example, when the terminal is to transmit encrypted data to a third party, the terminal may obtain the terminal root secret key from the first specified storage region, and use the terminal root secret key to encrypt the data to be transmitted. In order to further improve the storage security of the key, after obtaining the terminal root secret key, a second key digest of the terminal root secret key may be calculated and compared with the first key digest stored in the second specified storage region to determine whether or not the terminal root secret key stored in the first specified storage region has been modified. As such, the storage security of the terminal root secret key can be improved further.

Figure 4:
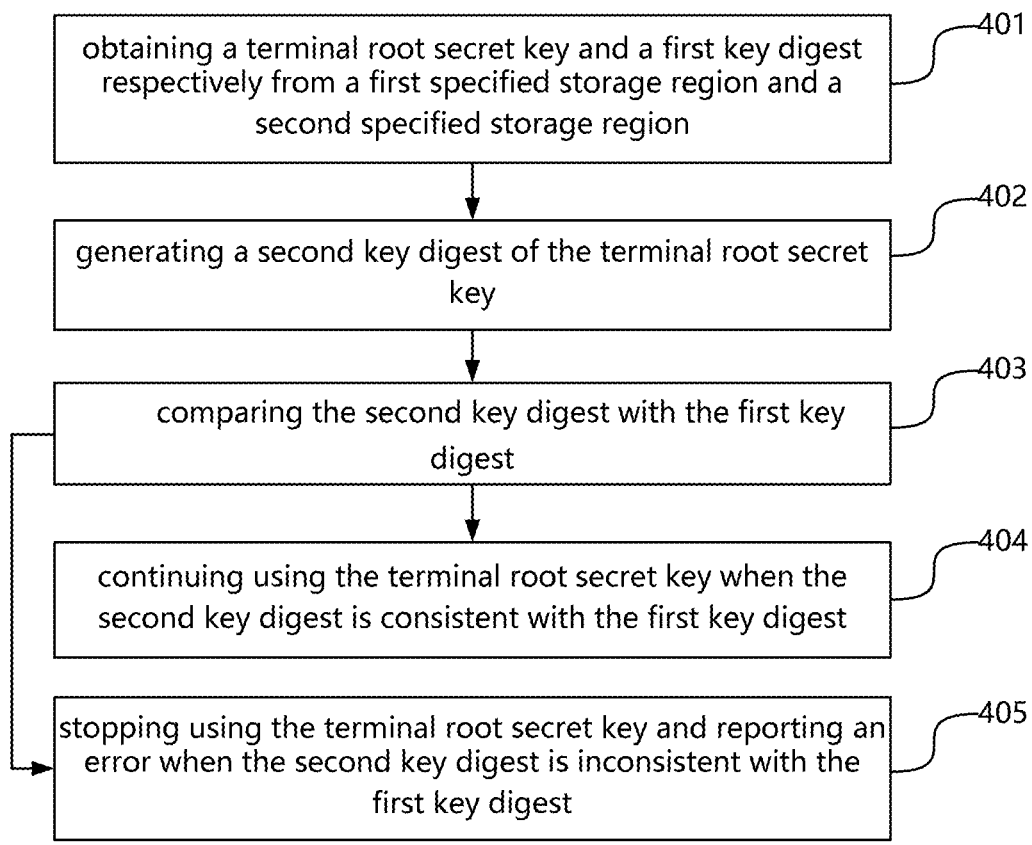
FIG. 4 is a flowchart illustrating a key managing method according to an embodiment of the present disclosure.

The process of the above method may be described with reference to FIG. 4. The method may include the following procedures.

At 401, the terminal root secret key and the first key digest may be respectively obtained from the first specified storage region and the second specified storage region.

Since the first specified storage region is a password protected region, the method of obtaining the terminal root secret key from the first specified storage region may include: calling an application interface for generating the terminal root secret key using a password, and obtaining the terminal root secret key from the first specified storage region by the application. Different methods may be used for obtaining the terminal root secret key from different first specified storage regions, and is not limited in embodiments of the present disclosure.

By obtaining the terminal root secret key and the first key digest from the first specified storage region and the second specified storage region respectively, the terminal can safely store the first key digest, safely use terminal root secret key to encrypt transmission data, and can check whether the terminal root secret key has been modified using the first key digest.

At 402, a second key digest of the terminal root secret key may be generated.

The method of generating the second key digest of the terminal root secret key may be the same with the method of generating the first key digest of the terminal root secret key in 302, thus is not elaborated herein.

It should be noted that the algorithm for calculating the second key digest is the same with the algorithm for calculating the first key digest of the terminal root secret key. The first key digest and the second key digest of the terminal root secret key are calculated using the same algorithm so that the first key digest and the second key digest are the same when the terminal root secret key is not modified.

At 403, the first key digest may be compared with the second key digest.

The second key digest may be compared with the first key digest to judge whether the terminal root secret key stored in the first specified storage region has undergone unpredicted damaging procedures, such as being tampered with or underwent a bit flip, etc., based on the comparing result. When the second key digest is consistent with the first key digest, the procedure in 404 may be performed. When the second key digest is inconsistent with the first key digest, the procedure in 405 may be performed.

At 404, the terminal root secret key may be continued to be used when the second key digest is consistent with the first key digest.

When the second key digest is consistent with the first key digest, it is determined that the terminal root secret keys corresponding to the key digests are identical, e.g., the terminal root secret key stored in the first specified storage region in the terminal has not been tampered with or undergone a bit flip, thus the terminal root secret key can still be used.

For example, when the terminal needs to transmit data to a server of a third party, the terminal root secret key can be used to encrypt the data to be transmitted so that only the server of the third party which is capable of obtaining the public key corresponding to the terminal root secret key can use the public key to decrypt the data to recover the data.

At 405, when the second key digest is inconsistent with the first key digest, an error may be reported and the terminal root secret key is stopped to be used.

When the second key digest is inconsistent with the first key digest, it is determined that the terminal root secret key has changed, e.g., the terminal root secret key stored in the first specified storage region in the terminal has been tampered with or undergone a bit flip, etc., which makes the terminal root secret key cannot be used with the public key stored in storage regions other than the terminal, and the terminal cannot perform encrypted data transmission with other terminals. Therefore, if the second key digest is inconsistent with the first key digest, the terminal key is stopped to be used and an error is reported. The manner of reporting the error is not limited in embodiments of the present disclosure.

When the second key digest is inconsistent with the first key digest, the terminal can be informed of the change in the terminal root secret key by the error reported, and can stop using the terminal root secret key to timely avoid situations such as data loss or stolen or the like.

Embodiments of the present disclosure can timely avoid situations such as data loss or stolen by obtaining the terminal root secret key and the first key digest, calculating a second key digest of the terminal root secret key using the algorithm for calculating the first key digest, comparing the second key digest with the first key digest to judge whether the terminal root secret key stored in the first designated storage region has been modified, reporting an error and stopping using the terminal root secret key when the terminal root secret key has been modified.

All of the above alternative technical mechanisms may be combined in any manner to form other embodiments of the present disclosure, and the other embodiments are not elaborated herein.

Figure 5:
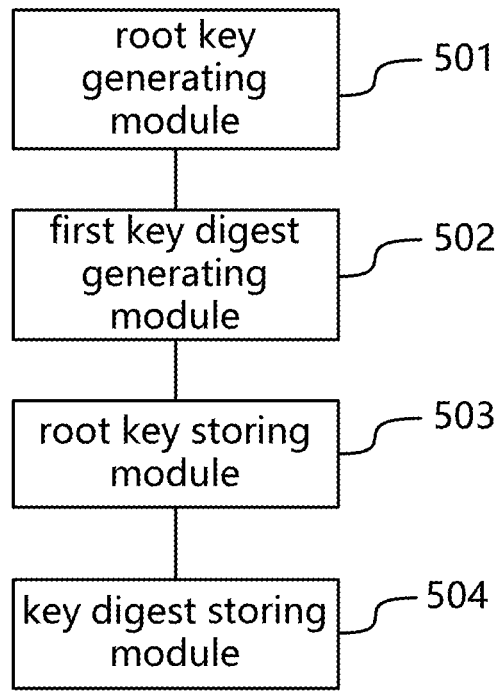
FIG. 5 is a schematic diagram illustrating the structure of a key storing apparatus according to an embodiment of the present disclosure.

FIG. 5 is a block diagram illustrating a key storing apparatus according to various embodiments of the present disclosure. As shown in FIG. 5, the apparatus may include a root key generating module 501, a first key digest generating module 502, a root key storing module 503, and a key digest storing module 504.

The root key generating module 501 may generate a terminal root secret key.

The first key digest generating module 502 may generate a first key digest of the terminal root secret key generated by the root key generating module 501.

The root key storing module 503 may store the terminal root secret key generated by the root key generating module 501 into a first specified storage region in the terminal. The first specified storage region is a password protected region.

The key digest storing module 504 may store the first key digest generated by the first key digest generating module 502 into a second specified storage region in the terminal. The second specified storage region refers to a programmable hardware region having fusible features.

In a first example of the present disclosure, the first specified storage region and the second specified storage region are two storage regions independent from each other in the terminal.

In a second example of the present disclosure, the terminal root secret key is a private key in a key pair generated according to an asymmetric key algorithm.

Figure 6:
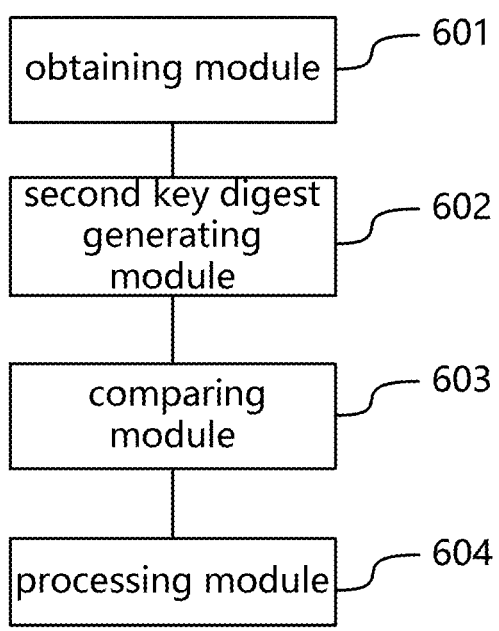
FIG. 6 is a schematic diagram illustrating the structure of a key managing apparatus according to an embodiment of the present disclosure.

FIG. 6 is a block diagram illustrating a key managing apparatus according to various embodiments of the present disclosure. As shown in FIG. 6, the apparatus may include: an obtaining module 601, a second key digest generating module 602, a comparing module 603, and a processing module 604.

The obtaining module 601 may obtain a terminal root secret key and a first key digest respectively from a first specified storage region and a second specified storage region in the terminal. The first key digest is a key digest of the terminal root secret key, the first specified storage region is a password protected region, and the second specified storage region is a programmable hardware region with fusible features.

The second key digest generating module 602 may generate a second key digest of the terminal root secret key.

The comparing module 603 may compare the second key digest with the first key digest.

The processing module 604 may continue to use the terminal root secret key when the second key digest is consistent with the first key digest.

According to an embodiment, the processing module 604 may also:

report an error and stop using the terminal root secret key when the first key digest is inconsistent with the second key digest.

According to another embodiment of the present disclosure, the algorithm for calculating the second key digest is the same with the algorithm for calculating the first key digest of the terminal root secret key.

According to yet another embodiment of the present disclosure, the terminal root secret key is a private key in a key pair generated according to an asymmetric key algorithm.

It should be noted that modules of the key storing apparatus for handling a key storing service of the above embodiments are modules classified by functions. In practice, the functions may be implemented by different function modules, e.g., the internal structure of the apparatus may be divided into different functional modules capable of implementing all or part of the above functions. In addition, the key storing apparatus of the above embodiments has the same concept with the key storing method. The processing of the apparatus is as described in the method embodiments, thus is not elaborated herein.

Figure 7:
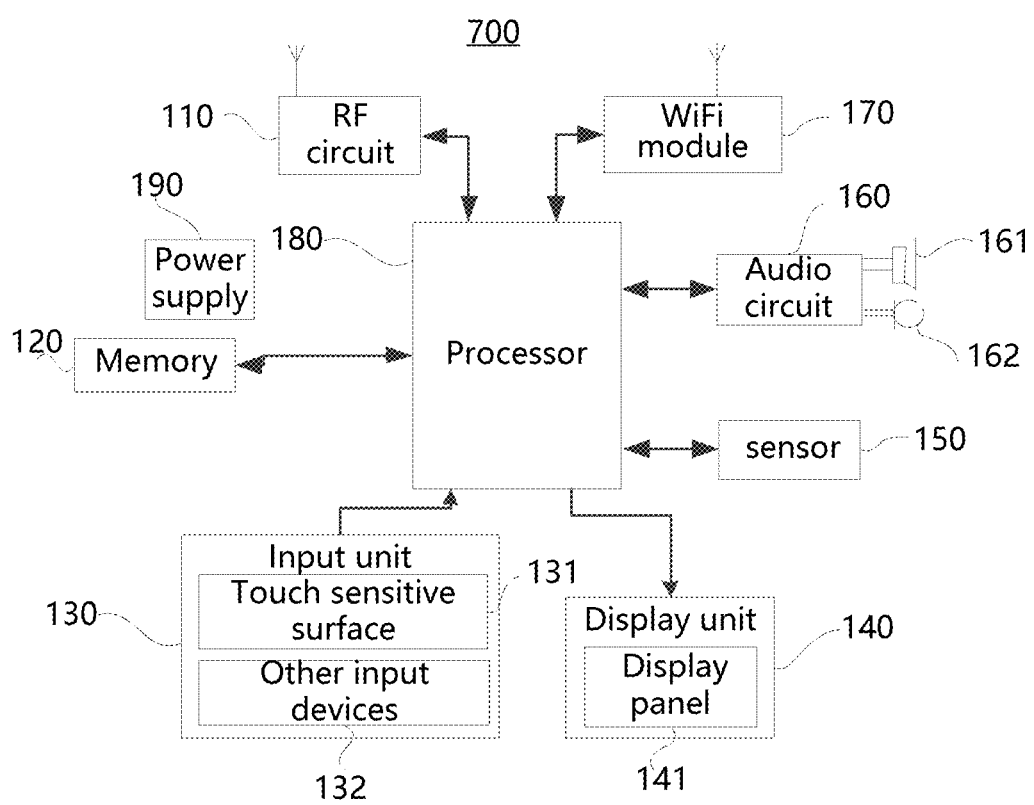
FIG. 7 is a block diagram illustrating a key storing apparatus according to an embodiment of the present disclosure.

Embodiments of the present disclosure provide a terminal capable of performing the key storing method of various embodiments of the present disclosure. As shown in FIG. 7, the terminal may include: a memory 120 including one or multiple computer-readable storage medium and a processor 180 including one or multiple processing cores. It can be understood to those skilled in the art that, the structure of the terminal as shown in FIG. 7 is not for limiting the terminal of embodiments of the present disclosure. The terminal in various embodiments of the present disclosure may include more or less components than as shown in FIG. 7. In the terminal of some other embodiments, some components may be integrated, or may be arranged differently.

The memory 120 may store software programs and modules. The processor 180 may perform various functional applications and data processing by running the software programs and modules stored in the memory 120. The memory 120 may mainly include: a program storage area and a data storage area. The program storage area may store an operating system, and applications implementing at least one function (such as a sound playing function, an image playing function, etc.). The data storage area may store data created during running of terminal 700 (such as audio data, phone book, etc.). In addition, the memory 120 may include high-speed random access memory and may include non-volatile memory, such as at least one disk storage devices, flash memory, or other nonvolatile solid-state memory devices. Accordingly, the memory 120 may also include a memory controller to enable the processor 180 and input unit 130 to access the memory 120.

The processor 180 is a control center of terminal 700, and is connected to various parts of a mobile phone through various interfaces and wires. The processor 180 may perform functions of terminal 700 and process data by running or executing software programs and/or modules stored in the memory 120 and calling data stored in the memory 120 to monitor the mobile phone. Optionally, the processor 180 may include one or multiple processing cores. Preferably, the processor 180 may be integrated with an application processor and a modem processor. The application processor may mainly handle the operating system, user interfaces and applications. The modem processor may mainly process wireless communications. It can be understood that the modem processor may alternatively not be integrated into the processor 180.

In particular, in various embodiments of the present disclosure, one or multiple programs may be stored in the memory 120, and may be configured to be executed by one or multiple processors 180.

The one or multiple programs comprise the following instruction modules:

a root key generating module 501, capable of generating a terminal root secret key;

a first key digest generating module 502, capable of generating a first key digest of the terminal root secret key generated by the root key generating module 501;

a root key storing module 503, capable of storing the terminal root secret key generated by the root key generating module 501 into a first specified storage region in the terminal. The first specified storage region is a password protected region; and a key digest storing module 504, capable of storing the first key digest generated by the first key digest generating module 502 into a second specified storage region in the terminal. The second specified storage region refers to a programmable hardware region having fusible features.

In another example, the one or multiple programs may include the following instruction modules:

an obtaining module 601, capable of obtaining a terminal root secret key and a first key digest respectively from a first specified storage region and a second specified storage region in the terminal; the first key digest is a key digest of the terminal root secret key, the first specified storage region is a password protected region, and the second specified storage region is a programmable hardware region with fusible features;

a second key digest generating module 602, capable of generating a second key digest of the terminal root secret key;

a comparing module 603, capable of comparing the second key digest with the first key digest; and a processing module 604, capable of continuing to use the terminal root secret key when the second key digest is consistent with the first key digest.

According to an embodiment, the processing module 604 may also:

report an error and stop using the terminal root secret key when the first key digest is inconsistent with the second key digest.

Besides the above components, the terminal 700 may also include a RF (Radio Frequency) circuit 110, an input unit 130, a display unit 140, a sensor 150, an audio circuit 160, a WiFi (Wireless Fidelity) module 170, a power supply 190, or the like. It can be understood to those skilled in the art that, the structure of the terminal as shown in FIG. 7 is not for limiting the terminal of embodiments of the present disclosure. The terminal in various embodiments of the present disclosure may include more or less components than as shown in FIG. 7. In the terminal of some other embodiments, some components may be integrated, or may be arranged differently.

The RF circuit 110 may send and receive signal during data receiving and transmitting or during a call, e.g., delivering downlink data to the one or multiple processors 180 for processing after receiving the downlink data from a base station; transmitting uplink data to the base station. Typically, the RF circuit may include, but not limited to, an antenna, at least one amplifier and a tuner, one or more oscillators, a Subscriber Identity Module (SIM) card, a transceiver, a coupler, a Low Noise Amplifier (LNA), a duplexer, etc. In addition, the RF circuit 110 may also communicate with other devices via wireless communication and a network. The wireless communication may conform to any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), or the like.

The input unit 130 may receive entered digits or characters, and generate input signal related to user settings and function control of a keyboard, a mouse, an operating lever, an optical input or a trackball. Specifically, the input unit 130 may include: a touch sensitive surface 131, and other input devices 132. The touch sensitive surface 131 may be also referred to as a touch screen or a track pad, capable of collecting touch operations on or near it (for example, an operation of a user using a finger, a stylus or other suitable object or accessory on or near the touch sensitive surface 131) and driving a connected device according to a preset program. Optionally, the touch sensitive surface 131 may include two parts: a touch detecting device and a touch controller. The touch detecting device detects a user's touch position and a signal generated by the touch operation, and transmits the signal to the touch controller. The touch controller may receive touch signal from the touch detecting device, convert the control signal into contact coordinates, send to the processor 180, and receive commands sent by the processor 180 and execute the commands. In addition, the touch sensitive surface 131 can be resistive, capacitive, infrared and surface acoustic wave-based, or the like. Besides the touch sensitive surface 131, the input unit 130 may also include other input devices 132. Specifically, other input devices 132 may include, but be not limited to, one or multiple of the following: physical keyboard, function keys (such as volume control buttons, on/off buttons, etc.), track balls, mice, levers, or the like.

The display unit 140 may display information inputted by the user, or information provided to the user, and various graphical user interfaces of terminal 700. The graphical user interfaces may be formed by graphics, text, icons, videos, and any combination thereof. The display unit 140 may include a display panel 141. The display panel 141 may be configured to be in the form of a Liquid Crystal Display (LCD), an Organic Light-Emitting Diode (OLED), or the like. Further, the display panel 141 may be covered by the touch-sensitive surface 131. When the touch sensitive surface 131 detects a touch operation on or near it, the touch operation may be transmitted to the processor 180 to determine the type of touch event. Then the processor 180 may provide related visual outputs on the display panel 141 according to the type of the touch event. Although in FIG. 7, the touch sensitive surface 131 and the display panel 141 are illustrated as two separate components respectively implementing input and output functions, in some embodiments, the touch sensitive surface 131 and the display panel 141 may be integrated to implement input and output functions.

The terminal 700 may also include at least one type of sensor 150, such as a light sensor, a motion sensor, or the like. Specifically, an optical sensor may include an ambient light sensor and a proximity sensor. The ambient light sensor may adjust the brightness of the display panel 141 according to the ambient light's brightness. The proximity sensor may close the display panel 141 and/or backlight when the terminal 700 is moved near the ear. As a motion sensor, an accelerometer can detect the size of accelerations in all directions (usually triaxial), and the size and direction of gravity when it is still which is applicable to applications requiring the phone gesture (such as an application that switches between landscape and portrait views, certain game, magnetometer attitude calibration), vibration recognition-based functions (such as pedometer, percussion), or the like. The terminal 700 may include other sensors, such as gyroscope, barometer, hygrometer, thermometer, the infrared sensor and other sensor, which are not listed herein.

The audio circuit 160, the speaker 161 and the microphone 162 may provide an audio interface between the user and the terminal device 700. An audio circuit 160 may convert received audio data into electrical signals, and send the electrical signals to the speaker 161. The speaker 161 may convert the electrical signals into sound and outputs the sound. The microphone 662 may convert collected sound signals into electrical signals which are received by the audio circuit 660. The audio circuit 660 may convert the electrical signals into audio data, and sends the electrical signals to the processor 680 for processing. The processed audio data may be sent to another terminal device via the RF circuit 610, or be output to the storage device 620 for future processing. The microphone 162 may also convert collected sound signals into electrical signals which may be received and converted by the audio circuit 160 into audio data. The audio data may then be processed by the processor 180, and sent through the RF circuit 110 to another terminal or outputted to the memory 120 for further processing. The audio circuit 160 may also include an ear jack providing communications between a peripheral earphone and the terminal device 700.

WiFi is a short-distance wireless communications technique. The terminal device 700 may adopt a WiFi module 170 to provide wireless broadband Internet access to enable a user to send and receive emails, browse webpages and access stream media and so on. In an example, the terminal device 700 may not include the WiFi module 170 although it is shown in FIG. 7. The structure in FIG. 11 is merely an example, modifications can be made as long as they do not change the mechanism of the examples.

The terminal device 700 may also include a power supply 190 (e.g., a battery) providing power for various parts. In an example, the power supply may be logically connected with the processor 180 via a power supply management system to implement functions such as charging, discharging, power management and the like. The power supply 190 may also include any components such as one or multiple AC or DC power supply, a recharging system, a power failure detection circuit, a power converter or inverter, a power status indicator and the like.

Although not shown in the figures, the terminal device 700 may also include a camera, a bluetooth module and the like, which is not described further herein. In an example, the displaying unit in the terminal device is a touch screen display. The terminal device may also include a memory and at least one program. The at least one program is stored in the memory, and includes instructions which are configured to be executed by at least one processor to implement the functions of the example. The at least one program includes a program executing the above key storing method.

It can be understood by those skilled in the art that all or some of the procedures of the above embodiments may be implemented by hardware, or by hardware as instructed by a program, e.g., the program can be executed by hardware to implement all or some of the above procedures. The program may be stored in a computer-readable storage medium. The storage medium may be read-only storage medium, magnetic disks or compact disks, or the like. The computer-readable storage medium may be a non-transitory computer-readable storage medium.

The above embodiments are merely preferable embodiments of the present disclosure, and are not for limiting the present disclosure. Any modification, equivalent replacements or improvements in accordance with the spirit and principles of the present disclosure shall fall within the protection range of the present disclosure.

What is claimed is:

1. A secret key managing method, comprising:
   by a terminal device,
   generating an asymmetric key pair using codes written in a trusted application running in a trusted execution environment in the terminal device, wherein the asymmetric key pair comprises a public key and a private key;
   storing the public key in a key management server accessible by another device;
   using the private key as an original root secret key of the terminal device for communicating data between the terminal device and the another device;
   generating a first key digest of the original root secret key;
   storing the original root secret key in a password protected region which requires a password for access in the terminal device;
   storing the first key digest in a programmable hardware region with fusible features which make the first key digest non-modifiable in the programmable hardware region in the terminal device;
   before using the original root secret key,
   obtaining a root secret key from the password protected region;
   obtaining the first key digest from the programmable hardware region with fusible features;
   generating a second key digest which is a digest of the root secret key;
   comparing the second key digest with the first key digest;
   using the root secret key when the second key digest is equal to the first key digest; and
   reporting an error and stopping using the root secret key when the second key digest is not equal to the first key digest.

2. The method of claim 1, wherein generating the first key digest of the original root secret key comprises: generating the first key digest using an irreversible string transformation algorithm by taking the original root secret key as text information.

3. The method of claim 1, wherein the password protected region and the programmable hardware region with fusible features are two storage regions independent from each other in the terminal device.

4. The method of claim 1, wherein the original root secret key is a private key in a key pair generated according to an asymmetric key algorithm.

5. The method of claim 1, wherein the second key digest of a private key in the terminal root secret key is generated using the same algorithm for generating the first key digest of a private key in the original root secret key.

6. The method of claim 1, wherein the asymmetric key pair is generated according to an asymmetric key algorithm.

7. A secret key managing apparatus, comprising: a processor and a memory storing computer-readable instructions executable by the processor to:
   generate an asymmetric key pair asymmetric key pair of a terminal device using codes written in a trusted application running in a trusted execution environment in the terminal device, wherein the asymmetric key pair comprises a public key and a private key;
   store the public key in a key management server accessible by another device;

use the private key as an original root secret key of the terminal device for communicating data between the terminal device and the another device;

generate a first key digest of the original root secret key;

store the original root secret key in a password protected region which requires a password for access in the terminal device;

store the first key digest in a programmable hardware region with fusible features which make the first key digest non-modifiable in the programmable hardware region in the terminal device;

before using the original root secret key, obtain a root secret key from the password protected region;

obtain the first key digest from the programmable hardware region with fusible features;

generate a second key digest which is a digest of the root secret key;

compare the second key digest with the first key digest;

use the root secret key when the second key digest is equal to the first key digest; and report an error and stopping using the root secret key when the second key digest is not equal to the first key digest.

8. The apparatus of claim 7, wherein the password protected region and the programmable hardware region with fusible features are two storage regions independent from each other in the terminal device.

9. The apparatus of claim 7, wherein the asymmetric key pair is generated according to an asymmetric key algorithm.

10. The apparatus of claim 7, wherein an algorithm used for generating the first key digest of a private key in the root secret key is the same as the algorithm used for generating the second key digest of a private key in the original root secret key.

11. The apparatus of claim 7, wherein the asymmetric key pair is generated according to an asymmetric key algorithm.

12. A non-transitory computer readable storage medium comprising instructions that, when executed by one or more processors, cause the processors to:

generate an original root secret key of a terminal device using codes written in a trusted application running in a trusted execution environment in the terminal device, wherein the original root secret key is usable for encrypting data sent by the terminal device to another device;

generate a first key digest of the original root secret key;

store the original root secret key in a password protected region which requires a password for access in the terminal device;

store the first key digest in a programmable hardware region with fusible features which make the first key digest non-modifiable in the programmable hardware region in the terminal device;

obtain a root secret key from the password protected region;

obtain a first key digest from the programmable hardware region with fusible features;

generate a second key digest which is a digest of the root secret key;

compare the second key digest with the first key digest; and use the root secret key when the second key digest is equal to the first key digest.

\* \* \* \* \*